United States Patent [19]

Hakoun et al.

[11] Patent Number: 5,121,866
[45] Date of Patent: Jun. 16, 1992

[54] COMPACT TOOL FOR CUTTING OPTICAL FIBERS

[75] Inventors: Roland Hakoun, Domont; Jean Galopin, St Leger en Yvelines; Michel Reslinger, Bondoufle, all of France

[73] Assignee: Alcatel Fibres Optiques, Cedex, France

[21] Appl. No.: 662,133

[22] Filed: Feb. 28, 1991

[30] Foreign Application Priority Data

Mar. 1, 1990 [FR] France ............... 90 02580

[51] Int. Cl.⁵ .................... B26F 3/00; C03B 37/16
[52] U.S. Cl. ........................... 225/96.5; 225/105
[58] Field of Search ............... 225/2, 96, 96.5, 101, 225/103, 105, 104

[56] References Cited

U.S. PATENT DOCUMENTS

| | | | |
|---|---|---|---|
| 4,036,419 | 7/1977 | Hensel et al. | 225/96.5 |
| 4,154,385 | 5/1979 | Lewis | 225/96.5 |
| 4,159,793 | 7/1979 | Belmonte et al. | 225/96.5 |
| 4,202,475 | 5/1980 | Hirai et al. | 225/2 |
| 4,229,876 | 10/1980 | Doty | 225/96.5 X |
| 4,257,546 | 3/1981 | Benasutti | 225/96.5 |
| 4,445,632 | 5/1984 | Margolin et al. | 225/2 |
| 4,474,319 | 10/1984 | Walker | 225/96.5 |
| 4,557,049 | 12/1985 | Cribbs et al. | 225/96 X |
| 4,573,617 | 3/1986 | Durkow | 225/96 |
| 4,619,387 | 10/1986 | Shank et al. | 225/96.5 |

Primary Examiner—Douglas D. Watts
Assistant Examiner—Eugenia A. Jones
Attorney, Agent, or Firm—Sughrue, Mion, Zinn, Macpeak & Seas

[57] ABSTRACT

A cutting tool has four main parts hinged about two axes parallel to the direction of the fiber to but cut. Progressively increasing hand pressure applied by a user enables certain operations to be performed automatically and in succession. Two pairs of jaws are clamped to prevent the fiber from moving between two axially spaced points. The fiber is put under tension by applying an anvil thereagainst, and cleaving is initiated by applying a diamond chisel against the fiber, with cleaving being completed by the tension set up by the anvil. Three springs exert different force couples, thereby determining the order in which these operations occur.

3 Claims, 5 Drawing Sheets

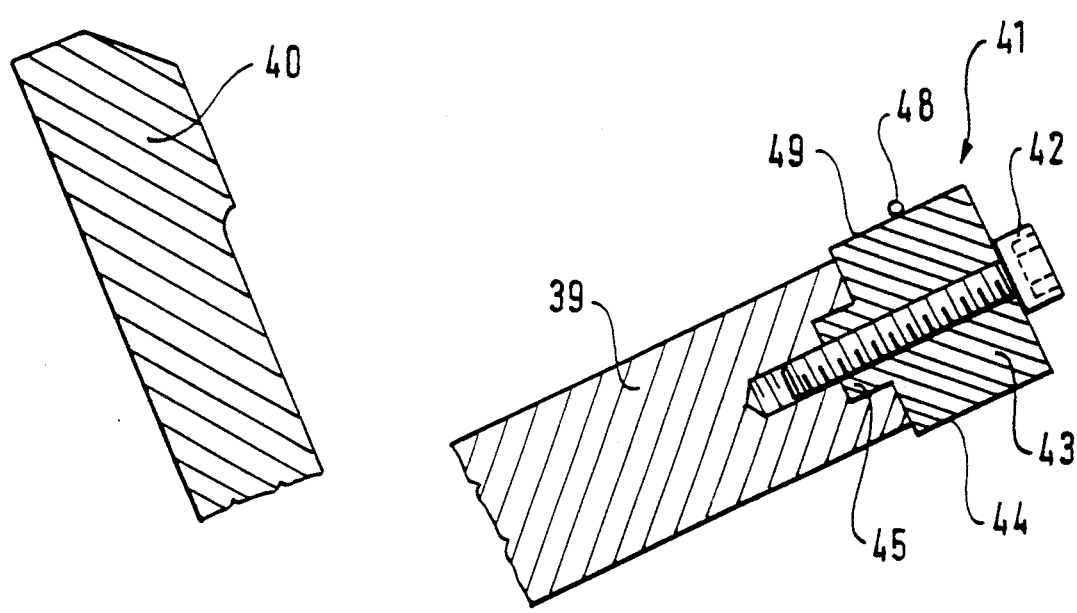

COMPACT TOOL FOR CUTTING OPTICAL FIBERS

The present invention relates to a compact tool for on site use to cut an optical fiber perpendicularly to its axis with an accuracy of 1° that is reproducible.

BACKGROUND OF THE INVENTION

A prior cutting tool comprises:

two pairs of jaws for holding the optical fiber to be cut at two points, each pair of jaws comprising a stationary jaw and a moving jaw, with the moving jaw being guided in translation by cylindrical rods sliding in holes in the jaw;

a first mechanical device for moving the two jaws in each pair slightly apart so as to enable an optical fiber to be inserted between the jaws;

an "anvil" piece in the form of an arc of a circle situated between the two pairs of jaws and displaceable to be applied against the optical fiber when the fiber is held in position by the two pairs of jaws;

a second mechanical device for applying the anvil against the fiber;

a diamond chisel displaceable to be applied against the optical fiber with predetermined force to initiate cleaving, with cleaving being finished off by the tension set up by the anvil; and a third mechanical device enabling the chisel to be applied against the fiber.

These three mechanical devices are actuated independently to displace the following in translation, respectively: the two pairs of jaws; the anvil; and the diamond chisel. These three translation motions are performed in succession and in that order. In conventional hand tools, these three mechanical devices suffer from being bulky and inconvenient to use since the three devices must be operated successively and in the proper order. Prior tools also suffer from the drawback of sometimes polluting the end of the optical fiber since the fiber may easily encounter dust while being inserted into the narrow space left between the jaws when the jaws are apart.

In other prior types of fiber-cutting tool, the fiber must be inserted in a capillary tube, but such insertion is difficult and the risk of polluting the fiber is high.

The three mechanical devices of prior tools suffer from wear, thereby degrading cutting accuracy as wear increases since fiber positioning becomes more and more inaccurate. In addition, the complexity of the mechanical devices makes it practically impossible for the purchaser of the tool to maintain on these devices, so the tool must be returned to the manufacturer for maintenance. Finally, prior tools suffer from being specialized in that they are suitable only for cutting either a fiber that has been bared or else a fiber that still includes its protective covering almost to the cutting point. For a fiber still in its covering, one of the pairs of jaws is of a size suitable for clamping the fiber and its jaws while the other pair of jaws is of a size suitable for clamping to the end of the fiber which has been bared over a length of a few centimeters.

An object of the invention is to remedy these drawbacks in prior tools for cutting optical fibers.

SUMMARY OF THE INVENTION

The present invention provides a compact tool for cutting optical fibers, the tool comprising:

two pairs of jaws for holding an optical fiber to be cut at two points;

first means for applying the two pairs of jaws against two respective points of the fiber;

an anvil situated between the two pairs of jaws;

a diamond chisel;

second means for applying the anvil against the fiber so as to put the fiber under tension between the two pairs of jaws; and third means for applying the chisel against the fiber opposite the anvil;

wherein the first, second, and third means each include at least one part capable of rotating about an axis parallel to the direction of the fiber between the two pairs of jaws.

By having all of the mechanical devices of this tool mounted to rotate about axes that are parallel to the fiber direction, it is possible to simplify these mechanical devices very considerably and in particular the tool can be opened wide for the purposes of: inserting a fiber into the tool with practically no risk of pollution; cleaning the inside of the tool, thereby further reducing risks of pollution; and maintaining the tool, in particular adjusting and replacing the diamond chisel. Because of their simplicity, these mechanical devices are also less subject to wear with respect to fiber positioning accuracy.

In a particular embodiment:

the means for applying the diamond chisel against the fiber and the means for applying the anvil against the fiber respectively include a first part and a second part rotating in opposite directions to each other; said parts moving towards each other under finger pressure exerted by an operator and moving away from each other under action exerted by at least one return spring when the operator ceases to exert finger pressure;

the means for applying the jaws comprise a third part for applying two first jaws against one side of the fiber relative to its axis, and a fourth part for applying two second jaws against the other side of the fiber; and the third and fourth parts rotate in opposite directions to each other and are driven respectively by the first and second parts via springs such that: the two pairs of jaws are applied against the fiber first; the anvil is applied against the fiber second; and the chisel is applied against the fiber third.

By virtue of this feature, continued pressure from the fingers of the operator closes the pairs of jaws, then moves the anvil to put the fiber under tension, and finally initiates fiber cleaving by applying the chisel thereto. The operator can thus perform all three separate maneuvers in a fixed order while continuing to hold the tool in the same manner, thereby greatly simplifying the task of the operator.

In a particular embodiment, the tool of the invention further includes means for guiding the fiber between the anvil and the chisel, said means comprising:

a plate having a V-groove formed therein and situated outside the two pairs of jaws, the plate being accessible to the operator to enable the operator to press the fiber into the groove by applying finger pressure thereto; and an arm fixed to one of the jaws to form a V-notch in association with said jaw, the V-notch having a plane orthogonal to the fiber and having a bottom that determines the position of the fiber.

This additional feature makes it possible to improve the accuracy with which the fiber is positioned in the tool. This positioning accuracy makes it possible to use a diamond chisel which is shorter and therefore cheaper than prior art diamond chisels, and above all it makes it possible to obtain improved cutting reproducibility.

In a particular embodiment, at least one of the jaws includes a part which can be removed and rotated to adapt the jaw to two different fiber diameters corresponding respectively to a covered fiber and to a bare fiber. By virtue of this feature, the tool is not specialized for one particular type of cutting.

BRIEF DESCRIPTION OF THE DRAWINGS

An embodiment of the invention is described by way of example with reference to the accompanying drawings, in which:

FIG. 8 shows a variant embodiment of a portion of the above embodiment of a tool of the invention.

DETAILED DESCRIPTION

Figure 1:
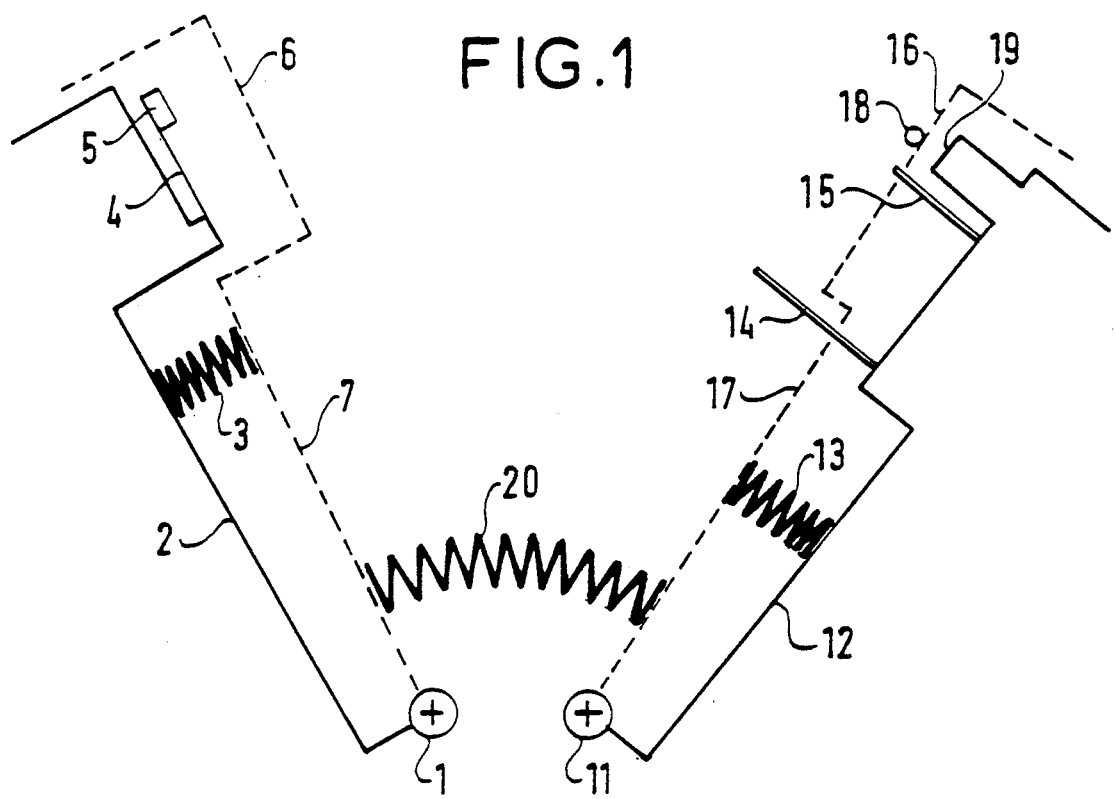
FIGS. 1, 2, 3, and 4 show four successive stages in the use of one embodiment of a tool of the invention.

In FIGS. 1 to 5, the component parts of the embodiment shown are depicted very diagrammatically in order to show the function of each part more clearly. In FIG. 1, the tool is fully opened to enable a fiber 18 for cutting to be installed therein. The tool has two rotary axes 1 and 11 which are parallel to each other and also parallel to the fiber direction. The essential parts of the tool are as follows:

a part 2 mounted to rotate about the axis 1 and supporting a diamond chisel 5 on a spring blade 4;

a part 7 rotatably mounted about the axis 1 and supporting two jaws, only one of which 6, is shown;

a part 12 mounted to rotate about the axis 11 and supporting an anvil 19 and two abutments 14 and 15;

a part 17 mounted to rotate about the axis 11 and supporting two jaws, only one of which 16, is shown;

a spring 3 interposed between the two parts 2 and 7 to urge them apart when they are at rest;

a spring 13 interposed between the parts 12 and 17 to urge them apart when the tool is at rest; and a spring 20 interposed between the parts 7 and 17 to urge them apart when the tool is at rest.

The parts 2 and 12 are the outermost parts of the tool. When a user makes use of the tool, the user applies finger pressure to the parts 2 and 12 urging them towards each other. The parts 7 and 17 are the innermost parts of the tool.

During an initial operating stage, the tool is at rest, i.e. it is open under the action of the spring 20 which moves the parts 7 and 17 away from each other. The user can then place the fiber 18 between the jaws 6 and 16 very easily and with little risk of pollution since the tool is opened wide.

Figure 2:
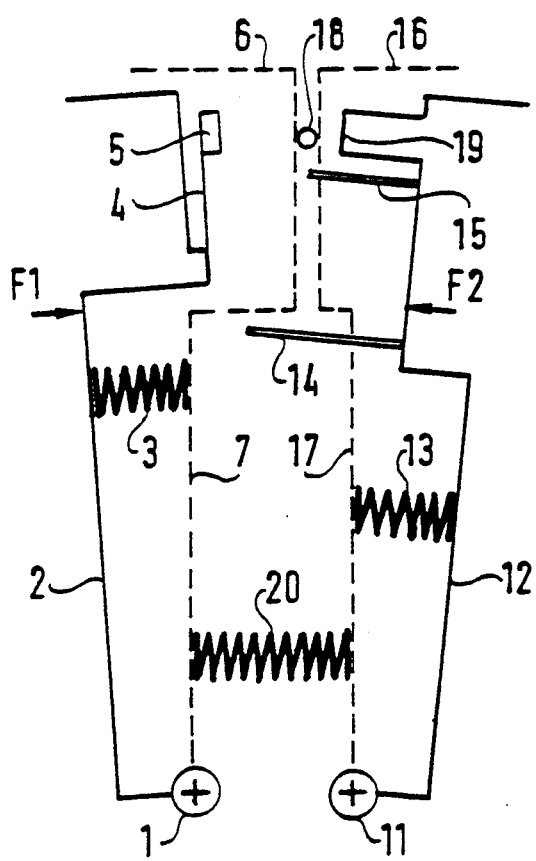

FIG. 2 shows a second operating stage of the tool. The user's finger exert opposing forces F1 and F2 on the parts 2 and 12. These forces are transmitted by the springs 3 and 13 causing the jaw-supporting parts 7 and 17 to move towards each other, and in particular causing the jaws 6 and 16 to hold the fiber 18 in position at two points that are a few centimeters apart. The spring 20 is fully compressed while the springs 3 and 13 are compressed only a little so the diamond chisel 5 and the anvil 19 are not yet applied against the fiber 18. The fiber 18 is held stationary in a perfectly rectilinear position.

Figure 3:
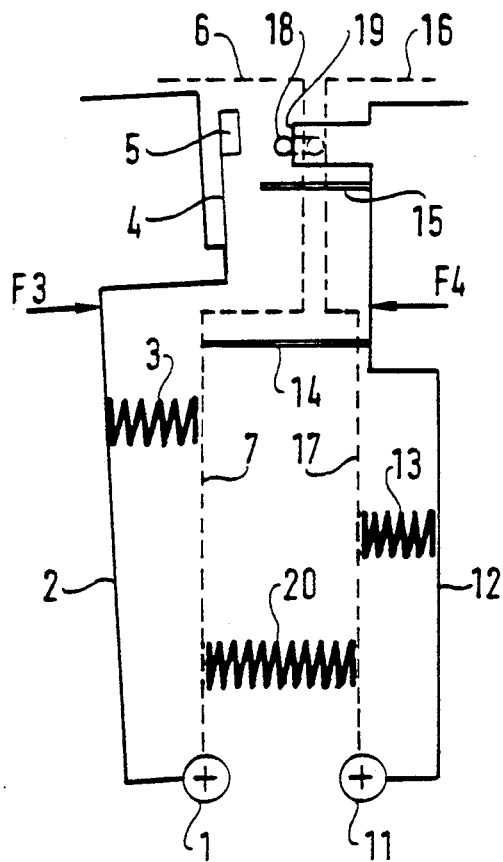

FIG. 3 shows the third operating stage of the tool. The operator's fingers exert slightly higher pressure than before by subjecting the parts 2 and 12 respectively to opposite forces F3 and F4 of larger magnitude than the forces F1 and F2. These forces compress the springs 3 and 13, but the spring 13 is compressed much more than the spring 3 in spite of being identical thereto because the spring 13 is closer to the axis 11 than is the spring 3 to the axis 1. The spring 20 is not compressed any further since the jaws were already caused to press against the fiber 18 during the second operating stage. By compressing the spring 13, the anvil 19 is applied against the fiber 18, thereby putting the fiber under tension. The traction exerted on the fiber 18 by the anvil 19 is limited by means of an abutment 14 which determines the minimum distance between the part 12 and the part 7 supporting the jaw on the opposite side of the fiber 18 from the anvil 19.

Figure 4:
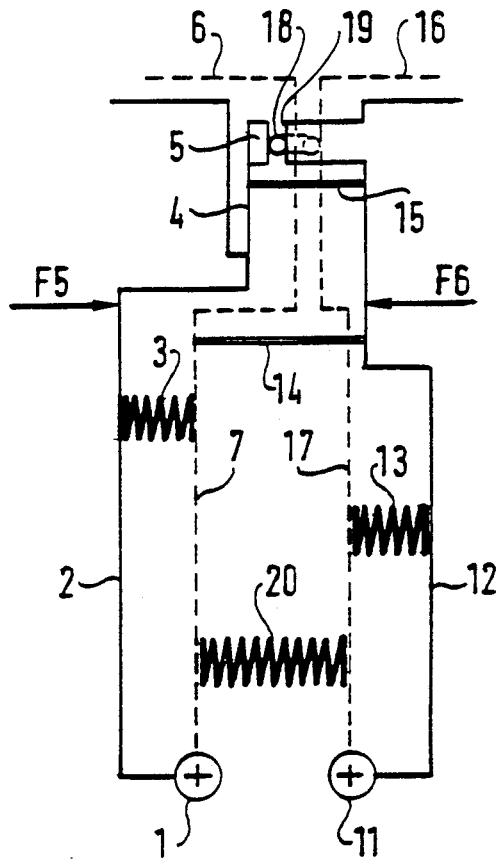

FIG. 4 shows the fourth operating stage. The operator's fingers exert still greater pressure, subjecting the parts 2 and 12 respectively to two opposite forces F5 and F6 of greater magnitude than F3 and F4. The spring 3 is compressed more than before. The part 2 moves the diamond chisel 5 closer to the fiber 18. The chisel penetrates into the fiber, nicking it to a depth of a few microns and thus initiating cleaving. Cleaving is completed by the nick propagating under the effect of the traction applied to the fiber. The force with which the chisel 5 is applied against the fiber is not determined by the forces F5 and F6, but rather by the bending force exerted by the spring blade 4 connecting the chisel 5 to the part 2. The penetration depth of the chisel 5 into the fiber 18 is limited by an abutment 15 which determines the minimum distance between the chisel 5 and the anvil 19.

Figure 5:
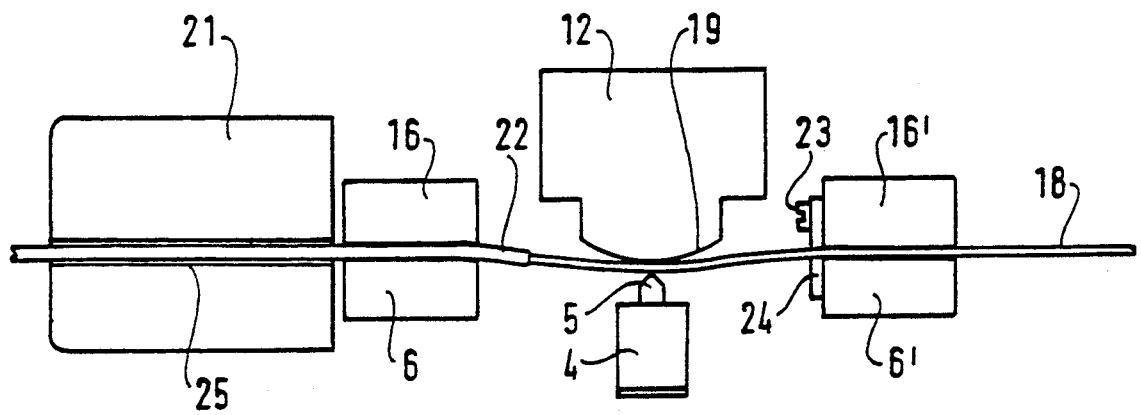
FIG. 5 shows the same stage as FIG. 4, but from a different viewpoint.

FIG. 5 is another view of the fourth operating stage of the tool of the invention, with the tool being shown as seen looking along a direction parallel to the clamping plane of the jaws. This figure shows above-mentioned jaws 6 and 16, and also jaws 6' and 16' which are not shown in the preceding figures, and which are constrained to move with the jaws 6 and 16, respectively. The jaws 6 and 16 are face to face when the jaws 6' and 16' are face to face, with the anvil 19 and the chisel 5 being situated in a gap of a few centimeters between these two pairs of jaws.

In the example utilization shown, the fiber 18 is bared in part. It is covered by a protective covering 22 up to a point situated between the pair of jaws 6, 16, and the anvil 19. The covering 22 is retained over the major portion of its length, and in particular where it passes between the pair of jaws 6, 16. However, between the pair of jaws 6' and 16', the fiber 18 is bared. The fiber is cut in a bared portion thereof.

The operating stages described above are performed in succession and in that order by the user's fingers exerting pressure continuously in one way only. The fiber and the cut-off length are released by releasing finger pressure, with the jaws being opened by the spring 20.

FIG. 5 shows how the anvil 19 curves the fiber 18, and it also shows the diamond chisel 5 in its position immediately prior to causing the fiber to be cleaved.

FIG. 5 also shows optional guide means for improving the accuracy with which the fiber 18 is positioned relative to the anvil 19 and to the chisel 5. These means comprise a plate 21 fixed to the jaw 6 and having a V-groove 25 formed therein to contain the covered fiber away from the jaws. The plate 21 is perpendicular to the plane of the jaws and projects away from the tool. It is accessible to allow the operator to hold a fiber in the groove 25 with one of the fingers of the left hand, while another finger of the left hand is pressed against the other face of the plate 21.

In addition, a guide arm 24 is fixed to the jaw 16' which is disposed symmetrically to the jaw 16 relative to the anvil 19, thereby forming a V-notch with the clamping plane of the jaw 16'. The fiber 18 rests in the bottom of this notch under its own weight or under the action of bending due to the fact that it is not perfectly rectilinear in shape immediately after being unwound from a spool. The guide arm 24 is fixed to the jaw 16' by a screw 23 and by glue to lock it in position once properly adjusted. These guide means make it possible to obtain a cut that is orthogonal to the axis of the fiber with a reproducible accuracy of 1°.

Figure 6:
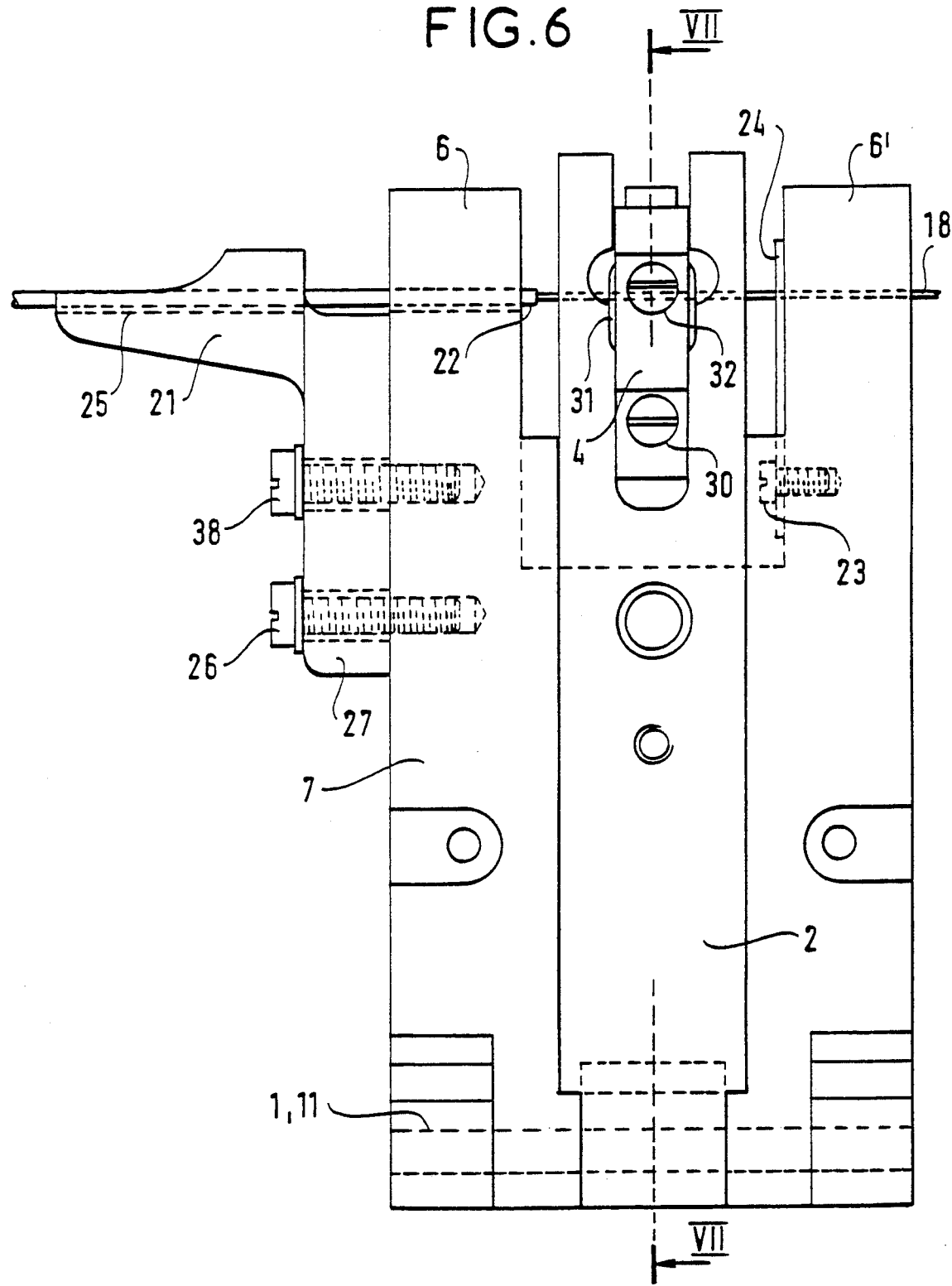
FIGS. 6 and 7 show further details of the same embodiment respectively seen end-on and as a side view in section.

FIG. 6 shows further details of the same embodiment as seen in face view. It can be seen that the plate 21 is extended by a lug 27 projecting orthogonally to the plate and fixed to the jaw 6 by means of two screws 38 and 26. This figure also shows the arms 24 and its fixing screw 23 which is screwed into the jaw 6'.

In this embodiment, the jaws 6 and 6' are integral with the part 7 which is made of aluminum, for example. The part 7 is generally in the form of a fork with the two tines of this fork constituting the jaws 6 and 6'. The chisel 5 is mounted on a support 31 suitable for passing between the two tines of the fork. The support 31 is connected by spring blade 4 to the part 2 which is an arm that is displaceable in the midplane of the fork. The support 31 is fixed to the spring blade 4 by a screw 32. The spring blade 4 is fixed to the part 2 by a screw 30.

Figure 7:
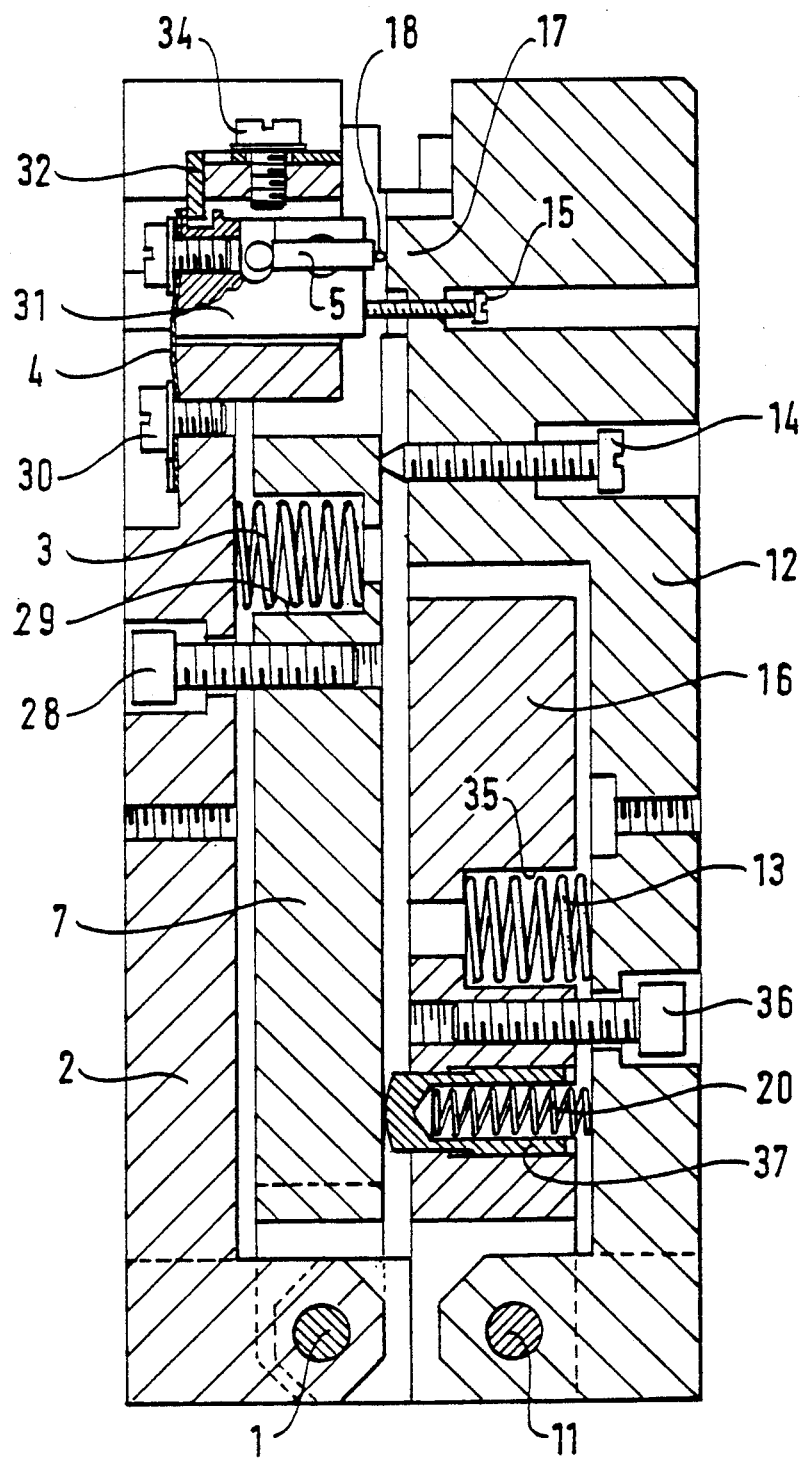

FIG. 7 is a section view of the same embodiment seen in the direction of arrows VII in FIG. 6. In this figure, it can be seen that the part 31 supporting the chisel 5 is capable of moving to an extent which is limited by a part 32 fixed to the part 2 by means of a screw 34. The abutment 15 is constituted by a screw which is screwed through the part 12 and whose end comes into abutment against the part 31. The abutment 14 is constituted by a screw which is also screwed through the part 12 and which comes into abutment against the part 7. The spring 3 is received in a hole 29 formed in the part 7 in a face which faces the part 2. The spring 13 is received in a hole 35 formed in the part 16 in its face facing the part 12.

The spring 20 is housed inside a cylindrical pushbutton 37 which is received in a hole formed through the part 16 and which opens out to face both the part 7 and the part 12. A shoulder in the hole and a shoulder on the pushbutton 37 limit the stroke of the pushbutton 37 so that it cannot escape from the hole when the tool is wide open. The tool may be opened to an angle close to 90°, with the extent to which it can be opened being limited by the shapes of the parts 2, 7, 17, and 12 in the vicinity of the axes of rotation 1 and 11. The extent to which the parts 2 and 7 can be moved apart by the spring is limited by a screw 28 sliding in a hole in the part 2 and screwed into the part 7. The extent to which the parts 16 and 12 can move apart under the action of the spring 13 is limited by a screw 36 sliding in a hole in the part 12 and screwed into the part 16.

The above description relates to cutting a fiber which is bared at the end only, such that the pair of jaws 6 and 16 clamps onto the fiber through its covering 22, whereas the pair of jaws 6' and 16' clamps against the bare fiber 18. The dimensions of the jaws 6 and 6' on the same side as the chisel 5 are therefore different to take account of the difference in diameter due to the covering 22. If the user desires to cut a fiber having a longer bared segment, then both jaws 6' and 16' must have the same dimensions adapted to the diameter of bare fiber.

FIG. 8 shows a pair of jaws 40 and 41 belonging to a variant embodiment of the tool of the invention and enabling the user to adapt the tool easily to clamping a fiber which is bared or which is not bared. These jaws 40 and 41 correspond to the jaws 6 and 16 in the above-described embodiment. The jaw 40 is identical to the jaw 6. Its dimensions do not alter as a function of the diameter of the fiber. In contrast, the jaw 41 has a removable part 43 which can be rotated to adapt the jaw 41 to two different fiber diameters, corresponding respectively to a covered fiber and to a bare fiber.

The part 43 is fixed to a part 39 analogous to the part 17 by a screw 42. The part 43 is accurately positioned relative to the part 39 by a projection 45 having a rectangular section with one of its axes parallel to the fiber 48, which projection is received in a groove formed in the end of the part 39. The screw 42 passes through the middle of the projection 45 so that it is possible to dismantle the part 43, to rotate it through 180°, and then to put it back into place and tighten the screw. The faces 44 and 49 of the part 43 are thus interchanged.

The scope of the invention is not limited to the embodiments described above. Numerous variants will occur to the person skilled in the art. In particular, the tool may be fixed to a support for use in a workshop by fixing its part 12 to a support. The user than merely needs to press against the part 2 in order to cut a fiber. The two axes 1 and 11 could coincide. The guide plate 21 could be disposed parallel to the plane of the jaws.

We claim:

1. A compact tool for cutting optical fibers, the tool comprising:
   two first jaws and two second jaws for holding an optical fiber to be cut at two axially spaced points;
   first means for applying the first and the second jaws against said two respective points of the fiber;
   an anvil situated between the first jaws and the second jaws;
   a diamond chisel;
   second means for applying the anvil against the fiber so as to put the fiber under tension between the first jaw and the second jaws;
   third means for applying the chisel against the fiber opposite the anvil;
   wherein the first, second, and third means each include at least one part capable of rotating about an axis parallel to the direction of the fiber between the first jaws and the second jaws; and wherein:
   the third means for applying the diamond chisel against the fiber and the second means for applying the anvil against the fiber respectively include a first part and a second part rotating in opposite directions to each other; said parts moving towards each other under finger pressure exerted by an operator and moving away from each other under action exerted by at least one return spring when the operator ceases to exert finger pressure; and
   the first means for applying the jaws comprise:

a third part for applying the first jaws against one side of the fiber relative to its axis; and a fourth part for applying the second jaws against the other side of the fiber; the third and fourth parts rotating in opposite directions to each other and being driven respectively by the first and second parts via springs such that:

the first and second jaws are applied against the fiber first; the anvil is applied against the fiber second; and the chisel is applied against the fiber third.

2. A tool according to claim 1, further including means for guiding the fiber between the anvil and the chisel, said means comprising:

a plate having a V-groove formed therein and situated outside the two pairs of jaws, the plate being accessible to the operator to enable the operator to press the fiber into the groove by applying finger pressure thereto; and an arm fixed to one of the jaws to form a V-notch in association with said jaw, the V-notch having a plane orthogonal to the fiber and having a bottom that determines the position of the fiber.

3. A tool according to claim 1, wherein at least one of the first and second jaws includes a part which can be removed and rotated to adapt the jaw to two different fiber diameters corresponding respectively to a covered fiber and to a bare fiber.

* * * * *